United States Patent [19]

Berger et al.

[11] Patent Number: 4,794,615
[45] Date of Patent: Dec. 27, 1988

[54] END AND SIDE PUMPED LASER

[75] Inventors: Josef Berger, Santa Clara; Donald R. Scifres, San Jose, both of Calif.

[73] Assignee: Spectra Diode Laboratories, Inc., San Jose, Calif.

[21] Appl. No.: 62,140

[22] Filed: Jun. 12, 1987

[51] Int. Cl.$^4$ .............................................. H01S 3/09
[52] U.S. Cl. ........................................ 372/69; 372/71;
372/26; 372/75; 372/83; 372/32
[58] Field of Search .................. 372/69, 71, 75, 83, 372/32, 26

[56] References Cited

U.S. PATENT DOCUMENTS

| | | | |
|---|---|---|---|
| 3,555,452 | 1/1971 | Nielsen et al. | 372/75 |
| 3,624,545 | 11/1971 | Ross | 372/75 |
| 3,735,280 | 5/1973 | Johnston, Jr. | 372/26 |
| 3,953,809 | 4/1976 | Kawamoto | 372/75 |
| 3,982,201 | 9/1976 | Rosenkrantz et al. | 331/94.5 P |
| 4,553,238 | 11/1985 | Shaw et al. | 372/6 |
| 4,575,854 | 3/1986 | Martin | 372/75 |
| 4,589,118 | 5/1986 | Suzuki et al. | 372/69 |
| 4,625,315 | 11/1986 | Lemberger et al. | 372/26 |
| 4,653,056 | 3/1987 | Baer et al. | 372/27 |
| 4,682,335 | 7/1987 | Hughes | 372/6 |
| 4,701,929 | 10/1987 | Baer et al. | 372/71 |
| 4,710,940 | 12/1987 | Sipes, Jr. | 372/75 |
| 4,713,822 | 12/1987 | Lee | 372/6 |
| 4,731,787 | 3/1988 | Fan et al. | 372/71 |
| 4,734,912 | 3/1988 | Scerbak et al. | 372/71 |

OTHER PUBLICATIONS

R. B. Chesler et al., "Miniature Diode-Pumped Nd:YAG Lasers," Appl. Phys. Lett., vol. 23, No. 8, Sep. 1, 1973, pp. 236-237.

Primary Examiner—Léon Scott, Jr.
Attorney, Agent, or Firm—Thomas Schneck

[57] ABSTRACT

A laser having a combination of end and side pumping so as to produce high power pulsed output with little or no delay between side pump pulses and laser output pulses, with suppressed spiking due to gain switching, and with high modulation rates. An active medium, such as a solid state laser rod, in a resonant optical cavity is pumped by a first optical pump source directing radiant energy into an end of the active medium so as to encourage or establish lasing operation in a desired transverse cavity mode, such as the TEM$_{00}$ mode. A second optical pump source directs additional radiant energy into a side of the active medium so as to amplify the intensity of the laser output in the desired mode. Typically, both pump sources are diode laser arrays, the first operating continuous wave or quasi-continuous wave, the second operating in high peak power pulses or being modulated at up to high data rates, that are determined by the cavity and active medium lifetimes and the ratio of the pumping power level to the threshold pumping level.

43 Claims, 2 Drawing Sheets

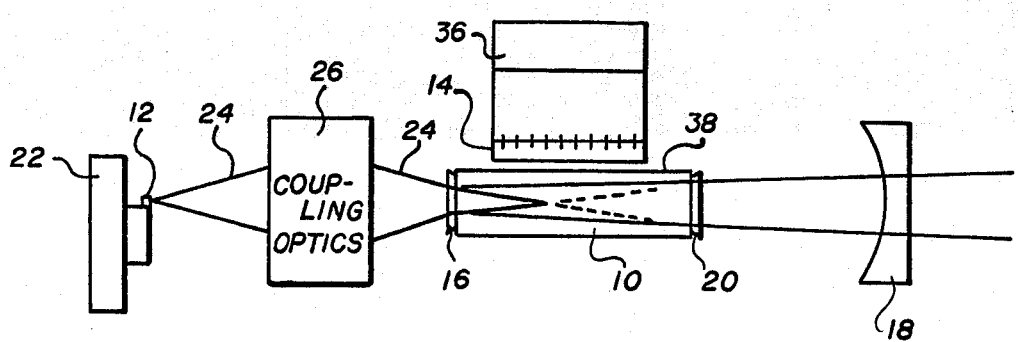
FIG._1
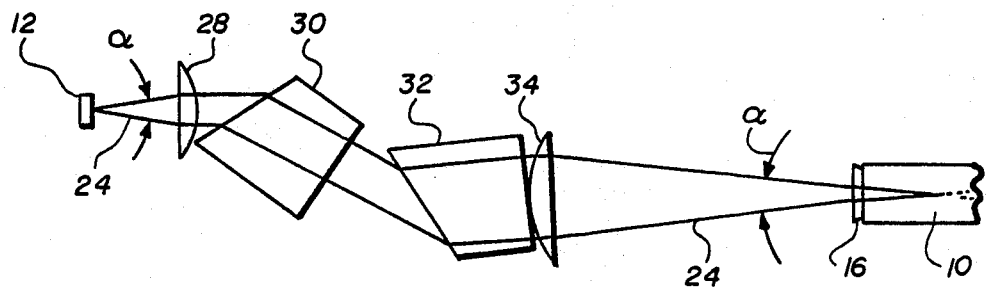
FIG._2
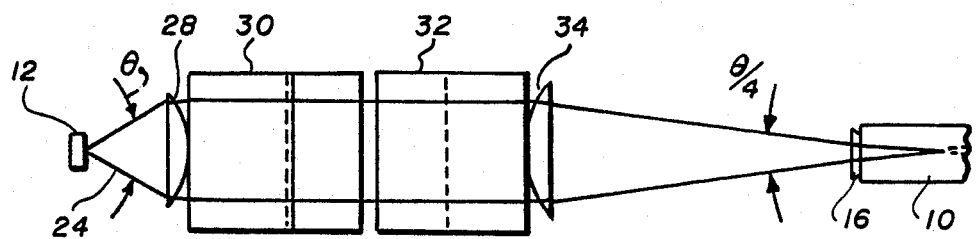
FIG._3

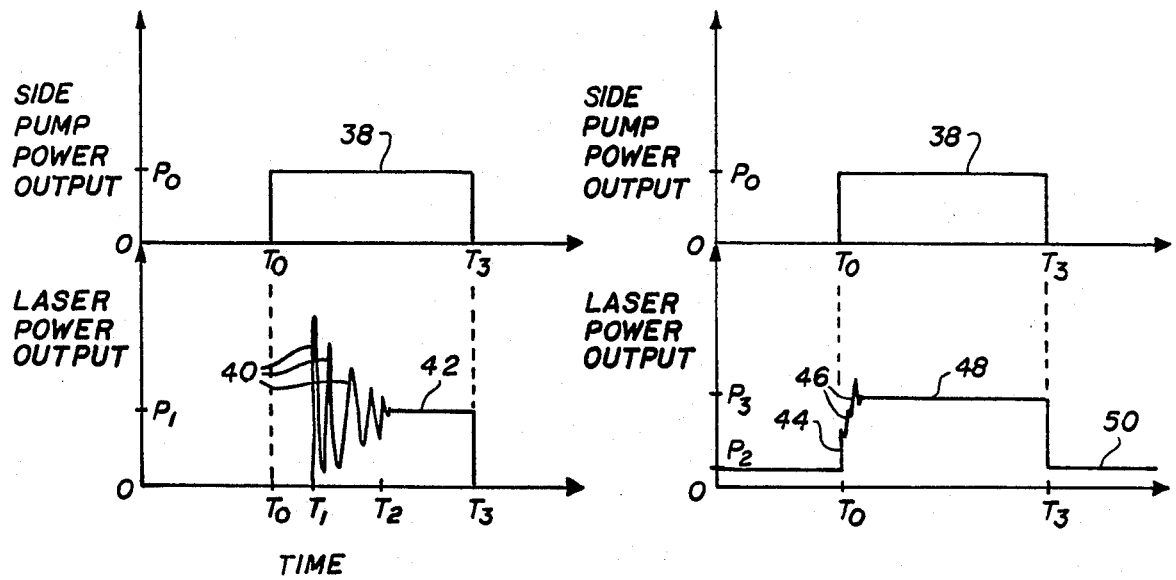
FIG.—4 (PRIOR ART)
FIG.—5
POWER
| | | PUMP #1 | PUMP #2 | OUTPUT |
|---|---|---|---|---|
| TEM$_{00}$ SPOT SIZE = 318 μm | A | 1 W CW | 0 W | 100 mW CW |
| | B | 0 W | 34 W PULSED | 3 W PULSED |
| | C | 1 W CW | 34 W PULSED | 4.4 W PULSED |
| TEM$_{00}$ SPOT SIZE = 130 μm | D | 1 W CW | 0 W | 277 mW CW |
| | E | 0 W | 37.8 W PULSED | 8.1 W PULSED |
| | F | 1 W CW | 37.8 W PULSED | 8.9 W PULSED |
FIG.—6

END AND SIDE PUMPED LASER

TECHNICAL FIELD

The present invention relates to lasers which are optically pumped with semiconductor diode lasers and further relates to lasers with output beam modulation.

BACKGROUND ART

A solid state laser, such as a Nd:YAG laser, is typically optically pumped and may be pumped by one or more semiconductor diode lasers or laser arrays. One pumping configuration, called a "side pumped laser" configuration, is disclosed in U.S. Pat. No. 4,575,854 to Martin. The patent describes a laser with a centrally located Nd:YAG rod and a plurality of diode bar arrays arranged circumferentially around the rod. Not all arrays are driven at the same time, but instead are switched between sequential bars, so that the arrays may operate uncooled with a low duty cycle and the rod output is a continuous wave. An advantage of this configuration is that the large surface area on the side of laser rod enables use of high power laser diode arrays resulting in high power output from the laser rod. The large amount of space around the side of the rod also enables thermoelectric coolers and heat sinks to be used so as to maintain the pump light wavelength from the laser arrays close to an absorption band of the rod.

However, in a side pumped laser configuration the rod volume is unhomogeneously pumped. Pumping is very strong near the rod surface where the light is injected so the pump volume is not well confined to the deiired $TEM_{00}$ cavity mode. As a result, higher order transverse modes lase and the output may exhibit spikes due to gain switching, especially at the beginning of a lasing pulse (before a steady state is attained). Attempts to maintain single $TEM_{00}$ mode operation by expanding the mode volume, for example, can result in a great increase in laser threshold and lower conversion efficiency.

A second pumping configuration, called an "end pumped laser" configuration, is disclosed in U.S. Pat. No. 4,653,056 to Baer et al. That patent describes a laser with a Nd:YAG laser rod together with a laser diode array toward the rear. A collimating lens converts the diverging beam from the laser diode array into a substantially parallel beam, then a lens focuses the beam into the back end of the rod. End pumped lasers are very efficient due to the full confinement of the pumped volume to the desired $TEM_{00}$ mode. However, laser diode arrays have a very high aspect ratio. The emitting region is thin, on the order of 1 $\mu m$ thick, in a direction perpendicular to the active region and can be extended to a width of several millimeters or more in a direction parallel to the active region to increase pump power. It is difficult to end couple the highly asymmetric light from the laser array into the desired $TEM_{00}$ cavity mode of the rod. The use of coupling optics and expansion of the cavity mode volume overcomes this problem for laser array widths only up to several hundred microns. Accordingly, the end pumped laser's output power is limited.

For communication and other applications it is desirable that a laser be modulated at a high rate with well controlled pulses. Presently, solid state lasers are modulated in various ways using acousto-optics, electro-optics or other effects. To obtain short pulses, Q-switch or cavity dumping techniques are used which typically also employ an electro-optic or acousto-optic cell to control the output pulses. However, these techniques require extra elements in the laser. Low frequency pulsed modulation can also be achieved by using pulsed lamp pumping. The repetition rates of this technique are usually less than 100 Hz. Semiconductor diode lasers, and diode laser arrays can also be modulated at high rates near threshold by varying the injection current used to pump these devices. However, modulating a solid state laser by means of diode laser array optical pump sources has been generally unsuccessful due to delays between optical pumping and laser output on the order of 10 microseconds or longer which limits the obtainable modulation frequency to tens of kilohertz. An additional problem with side pumped lasers is the spiking due to gain switching, which limits their utility since optical communications and other applications require stable pulses in the $TEM_{00}$ mode.

It is an object of the present invention to produce a laser with high power output, a stable transverse mode, and suppressed gain switching.

It is another object of the present invention to produce a laser which can be modulated at a high rate with no delay and little or no spiking, and which allows many types of modulation codes to be used.

DISCLOSURE OF THE INVENTION

The above objects have been met with a laser that is optically pumped using a combination of end and side semiconductor laser sources. An active medium in a resonant optical cavity, such as a solid state laser rod disposed between a pair of reflectors, is optically pumped to produce a coherent light output. A first optical pumping source directs radiant energy into an end of the active medium along its axis. This first source can be a relatively low power LED, laser diode or laser diode array operating in either a cottinuous wave or pseudo-continuous, i.e. high duty cycle pulsed, mode. First source may also comprise multiple light sources directed into the end of the active medium. A second optical pumping source directs radiant energy into a side of the active medium. This second source can be one or more high power laser diode array operating in either high power pulses or modulated at a high rate. Such diode laers can be directly modulated up to gigahertz rates.

The first optical pumping source, i.e. the end pumps, pumps a volume of the active medium which coincides with a desired transveres cavity mode, such as the $TEM_{00}$ mode. Pumping occurs at a rate which is sufficient to achieve lasing operation in the desired mode. The second optical pumping source, i.e. the side pump, need not be confined to the desired mode volume. Since the laser is already operating in the desired mode due to the first pumping source, the second pumping source has the effect of amplifying the intensity of the light output in the established desired mode. When the second pumping source is modulated, it is found that the laser light output is the amplified modulated input superimposed on the continuous wave $TEM_{00}$ mode light. The solid state laser output follows the modulated pump diode laser up to about 1 MHz or higher depending on the laser cavity length, mirror reflectiveness, internal losses, the material spontaneous and stimulated lifetimes and the power level of end pumping. Still higher modulation rates up to that of the diode laser itself may be possible given the proper material and laser parameters. This occurs with insignificant optical pulse delay and suppressed optical spiking. These features allow many types of modulation schemes to be used, including amplitude modulation, pulse width modulation, frequency modulation, pulse position modulation and the like.

BRIEF DESCRIPTION OF THE DRAWINGS

FIG. 1 is a simplified side view of a laser of the present invention.

FIG. 2 is an expanded top view of an end pumped portion of the laser in FIG. 1.

FIG. 3 is a side view of the end pumped portion of FIG. 2.

FIG. 4 is a graph comparing side pump power output and laser power output versus time for a laser of the prior art.

FIG. 5 is a graph comparing side pump power output and laser power output versus time for the laser of FIG. 1.

FIG. 6 is a table comparing laser output powers for various end and side pumping conditions.

Best Mode for Carrying Out the Invention

With reference to FIG. 1, a laser of the present invention includes an active medium 10, a first optical pumping source 12 and a second optical pumping source 14. Active medium 10 is typically a solid state laser rod. Such rods may be composed of material in either a crystalline or glass host material including Nd:YAG, Nd:glass, Nd:YLF, Nd:LLGG, ruby, alexandrite and other materials commonly used in solid state lasers. In addition to rods, slabs and other active medium geometries can be used. Alternatively, active medium 10 can be a liquid, such as a chelate or dye, or an optically pumpable gas. Active medium 10 is disposed in a resonant optical cavity defined between reflectors 16 and 18. For an active medium 10 which is a Nd:YAG rod, reflector 16 is typically a dielectric end coating on the rod which is highly reflective at 1.06 $\mu$m, the wavelength of the laser output, and antireflective at 0.81 $\mu$m, the wavelength of the pump radiation corresponding to an absorption band of the Nd:YAG rod. A typical high reflectivity dielectric stack coating has a reflectivity of about 99.8% at 1.06 $\mu$m and a transmissivity of about 93% at 0.81 $\mu$m. An antireflection coating 20 at 1.06 $\mu$m must be disposed on the opposite end of active medium 10. Reflector 18 may be a 95% reflecting (at 1.06 $\mu$m) concave mirror with a 0.1 to 2 meter radius of curvature mounted approximately 5 to 10 cm from planar reflector 16. Alternatively, reflector 18 may be a mirror which is fabricated directly on the output end of the active medium. The resulting beam waist radius in the resonant cavity is approximately 130 $\mu$m to 400 $\mu$m for the TEM$_{00}$ mode and positioned near reflector 16. Alternatively, the spacing and curvatures of reflectors 16 and 18 may be adjusted to expand or contract the TEM$_{00}$ mode waist to 400 $\mu$m or more, or 130 $\mu$m or less. An antireflective coating may be placed along the rod or slab solid state laser in the side region where the second diode laser pump light is incident. This increases the amount of pump light entering the solid state laser. In addition a reflecting coating or an external reflecting surface can be used to allow this pump light to make multiple passes in the solid state medium prior to absorption.

First optical pumping source 12 is typically a relatively low power laser diode array operating in a continuous wave or quasi-continuous wave mode and emitting light 24 with a wavelength near an absorption band of the active medium 10. A thermoelectric cooler or heat sink 22 may be used to heat or cool the laser array so as to match the laser array's output wavelength to the absorption band of active medium 10. A typical laser diode array for end pumping a Nd:YAG rod laser is a 0.5 W cw, 0.81 $\mu$m laser array, model no. SDL-2430-C, commercially available from Spectra Diode Laboratories of San Jose, Calif. Though rated at 0.5 W, up to 2.0 W cw output has been demonstrated. Laser diode array 2 emits light beam 24 which is directed by coupling optics 26 into an end 16 of active medium 10. One optical system which may be used for coupling optics 26 is shown in FIGS. 2 and 3. Optics 26 takes the asymmetric light beam 24 from laser diode array 12, having a lateral divergence $\alpha$ and a relatively greater transverse divergence $\theta$, and converts it into a more symmetric focused beam having a lateral convergence $\alpha$ and a transverse convergence $\theta/4$. A typical optical system for use with the present invention comprises a Melles-Griot 6.5 mm 0.615 NA collection lens 28 that substantially collimates the beam, a 4× anamorphic prism pair 30 and 32 that expands the lateral beam width, and a 25.6 mm focusing lens 34 that focuses the beam 24 into end 16 of active medium 10. The values given above are merely exemplary and other optical systems may also be used. Alternatively, light from one or more LEDs, laser diodes or laser diode arrays 12 may be coupled into end 16 of active medium 10 via one or more light transmissive fibers. Other coupling optics which may be used include other mirror or lens coupled optics, fiber bundles, fiber bundles with mixing rods, and holographic optics.

Second optical pumping source 14 is typically a high power wide area laser diode, laser diode array or fiber coupled laser diode. Alternatively, stacked laser diode arrays, any laser diode, LED, arc lamp or other optical pump could be used as the second optical pump source. With the rapid advances in semiconductor laser diode technology there are now single linear array devices commercially available with pulsed outputs over 25 watts per centimeter. A typical laser diode array 14 for use with the present invention is a 1 cm wide array emitting from 25 to 135 Watts peak power at about 0.81 $\mu$m wavelength for a pulse width of about 150 to 200 $\mu$sec and a repetition rate of 100 Hz or with shorter pulses and higher repetition rate, up to many tens of KHz. A thermoelectric cooler 36 may be used to maintain the temperature of laser diode array 14 so as to produce an output at an absorption band of the active medium 10. A single laser diode array 14 close coupled to a side 38 of active medium 10 may be used, but multiple laser diode arrays, single diode laser, fiber coupled diode lasers, or lens or mirror coupled diode lasers may also be used.

In operation, laser diode array 12 pumps a desired volume of active medium 10 from an end in order to achieve steady state continuous wave lasing in a desired transverse cavity mode typically the TEM$_{00}$ mode. The desired volume typically coincides with a desired transverse cavity mode, the end pump source 12 thereby preferentially pumping said mode. The coherent light output of the combination end and side pumped laser is thereby established in the desired mode. Laser diode array 12 preferably operates in a continuous wave mode with an output power of at least the pumping threshold of active medium 10 for the desired mode, but may also operate in a quasi-continuous (high duty factor) pulsed mode. Pulse widths on the order of 150 milliseconds are typical, although shorter high repetition rate high peak power pulses may also be used. The second laser diode array or light source 14 pumps active medium 10 from the side, the side pump filling a substantial portion of the volume of the active medium. The high power side pumping pulses temporarily increase the gain at different locations of the active medium. Since the laser is already operating above threshold due to the end pumping, the existing electric field causes depletion of the inverted population in the pulsed pumped volumes confined to the defined cavity mode set by the end pumped source. Thus the continuous wave electrical field prevents the development of high amplitude gain switched spikes, relaxation oscillation, unstable output patterns or other undesirable effects when the side pump is activated. The laser can be operated either near threshold or well above threshold depending upon the intensity of side pump 14, the side pump amplifying the intensity of the coherent laser output in the desired mode. Alternatively, the laser can be operated with a multimode output by not preferentially pumping the $TEM_{00}$ mode.

With reference to FIGS. 4-6, the laser power output for various pumping configurations is seen. The pair of graphs in FIG. 4 correspond to the examples B and E in FIG. 6, i.e. to the side pumped configuration of the prior art. The pair of graphs in FIG. 5 correspond to the examples C and F in FIG. 6, i.e. the combination end and side pumped configuration of the present invention. Examples A and D in FIG. 6 correspond to the end pumped configuration of the prior art. The power output values in examples D, E and F are for a Nd:YAG rod active medium about 10 mm long in the preferred resonant optical cavity noted above and with the above noted preferred laser diode arrays 12 and 14 in FIG. 1. Examples A, B, C are for the same medium and laser diode arrays except that the resonant optical cavity has been modified to expand the radius of the $TEM_{00}$ waist to 318 μm.

In examples A and D, an end pump source, indicated as pump #1, has a continuous wave power output of 1 Watt, while a side pump source, indicated as pump #2, is either nonexistent or turned off. As is typical of end pumped laser configurations, the laser output powers are 100 mW cw and 277 mW cw for $TEM_{00}$ waist spot sizes of 318 μm and 130 μm respectively. This low power output is in the $TEM_{00}$ mode.

In examples B and E, the end pump source is either nonexistent or turned off, while the side pump source, i.e. pump #2, has a pulsed peak power output of 34 W and 37.8 W respectively for a pulse width of 160 μsec. As is typical of side pumped laser configurations, the laser output powers are substantially higher than power outputs for end pumped lasers, having 3 W and 8.1 W pulsed power, respectively. However, as seen in FIG. 4, this side pumped laser configuration also has several disadvantages. In the upper graph of FIG. 4, side pump power output is zero watts prior to a time $T_0$, rises to a finite positive value $P_0$ at time $T_0$, and remains substantially constant until time $T_3$ when it again drops to zero watts. The pulse width, i.e. the duration of the pulse 38, is the time $T_3-T_0$, typically about 160 μsec as noted above. In the corresponding lower graph of FIG. 4, the laser power output is also zero watts prior to time $T_0$ begin to rise when pulse 38 begins at time $T_0$. Instead, there is a delay $T_1-T_0$ before laser output begins to rise at time $T_1$ followed by an interval from time $T_1$ to time $T_2$ in which the laser output exhibits large unstable spikes 40 due to gain switching. The laser output pulse 42 does not reach a stable power level $P_1$ until time $T_2$, then drops to zero at the end of the pump pulse 38 at time $T_3$. Typically, the delay $T_1-T_0$ is about 30 μ sec for 38 watt side pumping. In example B, where the $TEM_{00}$ mode volume is enlarged, the laser output eventually reaches a stable $TEM_{00}$ output. However, in example E, the laser output is not in the $TEM_{00}$ mode.

In examples C and F, both the end and side pump sources, i.e. pumps #1 and #2, are active, pump #1 having an output of 1 Watt cw and pump #2 having a peak pulsed output of 34 W and 37.8 W respectively. The resulting laser power outputs in examples C and F are slightly higher than the outputs in examples B and E respectively. The power outputs are also slightly higher than the combined outputs of end pumped only and side pumped only lasers, i.e. the output in example C is slightly higher than the sums of the outputs examples A and B. This is due to the amplification process which already exists in the lasing medium that makes it unnecessary for the side pumping to reach threshold of the Nd:YAG medium. Further, the total laser output energy per pulse is greater by 80% in C relative to E because the delay between the start of the side pump's pulse and the start of the laser output pulse is substantially reduced, and typically negligible. This and other advantages are illustrated in FIG. 5. The side pump pulse 38 in the upper graph of FIG. 5 is the same as that in FIG. 4. In the lower graph of FIG. 5, the laser output power is at a finite positive value $P_2$ prior to time $T_0$ corresponding to the end pumped lasers in examples A and D. At time $T_0$ or at a negligible time interval thereafter, the power exhibits a rise with a few minor spikes 46. The pulse quickly reaches a steady state 48 with a power level $P_3$ that is slightly higher than power $P_1$ in FIG. 4. The pulse remains substantially constant until time $T_3$ when it drops back to the power level $P_2$ exhibited prior to time $T_0$. Thus, the power output of lasers of the present invention have greater pulse widths and smooth pulses that quickly follow the side pump pulses. Additionally, while in example E the laser output may never reach the $TEM_{00}$ mode, the high power laser outputs in example C is in the $TEM_{00}$ mode, and in F is mainly in $TEM_{00}$ mode.

Although the side pumping laser diode array 14 in FIG. 1 may be operated with high peak power pulses, it can also be operated at a power level below the pump threshold of active medium 10. Since the end pump laser diode array 12 establishes continuous wave laser operation, any additional pump radiation from side laser array 14 gives rise to amplification in the lasing mode. So the side pumping laser diode array 14 can be modulated at high speed just above its threshold to create amplified pulses from the laser in FIG. 1 without any jitter. Any change in the amplitude of the pumping pulses results in a corresponding change in the intensity of the amplified laser pulses. This technique is useful for optical communication and other applications that require stable pulses with a $TEM_{00}$ cavity mode. Typically, amplified modulation rates of up to 1 MHz can be achieved, with higher rates possible by optimizing the laser active medium, resonant optical cavity and the like to minimize delay and spiking. The frequency of the relaxation oscillation $f_{ro}$ is given by:

$$f_{ro} \propto \frac{1}{2\pi} \sqrt{\frac{1}{\tau \cdot t_c}\left(\frac{P}{P_{th}} - 1\right)}$$

where $t_c \simeq \frac{l_{cavity}}{L_{loss} \cdot c} \sim 6 \times 10^{-9} sec$ and $\tau \simeq 162$ μsec for Nd:YAG. For $P/P_{th} \simeq 9$, $f_{ro} \simeq 0.46$ MHz. With the above described configuration, the laser can be modulated at this frequency regime. Since the laser output follows that of the modulated pump source up to the relaxation oscillation frequency of the active medium, many types of modulation encoding are possible including amplitude modulation, pulse position modulation and pulse width modulation.

Alternatively, instead of having an end pumping laser diode array with a steady continuous wave output, the end pumping laser diode array can be biased above or slightly below the continuous wave pumping threshold and the injection current can be modulated with the appropriate information. As a result, the laser optically pumped by the laser diode arrays will emit a modulated light superimposed on the continuous wave $TEM_{00}$ light. In laboratory experiments we have modulated the Nd:YAG medium up to the $f_{ro}$ for different $P/P_{th}$ ratios. We easily achieve 0.2 MHz repetition rate for the above described system.

While the laser of the present invention has been described in terms of the ebbodiment in FIG. 1, the combination side and end laser pumping configuration can also be used together with Q-switch or cavity dumping, longitudinal mode locking and frequency multiplying to achieve the desired laser performance. The pumping scheme of the present invention results in a laser with a stable desired transverse cavity mode, higher efficiency and power output, little or no delay, suppressed jitter or spiking, and a high frequency modulation capability.

We claim:

1. A laser comprising,
   an active medium in a resonant optical cavity,
   a first laser source emitting a laser light beam and disposed relative to said active medium so as to direct said beam into an end of said active medium, said active medium thereby having an optically pumped volume portion allowing oscillation of only single desired transverse cavity mode so as to produce a coherent light output, said coherent light output having an intensity,
   a second laser source emitting a beam of laser light and disposed relative to said active medium so as to direct additional laser light into a side of said active medium and thereby amplify the intensity of said coherent light output effectively eliminating spiking and delays and
   means for modulating at least one of said laser sources at a high frequency rate with well controlled high quality pulses thereby providing modulation of said coherent light output in a stable transverse cavity mode.

2. The laser of claim 1 wherein said optically pumped volume corresponds to a $TEM_{00}$ cavity mode.

3. The laser of claim 1 wherein said first laser source comprises at least one semiconductor laser, and means for coupling a light output from said semiconductor laser into said end of said active medium.

4. The laser of claim 1 wherein said second laser source comprises at least one semiconductor laser, a light output from said semiconductor laser being directed into said side of said active medium.

5. The laser of claim 1 wherein said first laser source comprises a continuous wave laser.

6. The laser of claim 1 wherein said first laser source comprises a repetitively pulses laser, said repetitively pulsed laser being on at least during time intervals when said second laser source is on.

7. The laser of claim 1 wherein said second laser source comprises a pulsed laser.

8. The laser of claim 7 wherein said pulsed laser has a peak pulse power output which is substantially above a pumping threshold of said active medium.

9. The laser of claim 1 wherein said first laser source is pulsed at a rate greater than that of said second laser source.

10. A laser comprising:
    an active medium in a resonant optical cavity,
    a first laser source emitting a laser light beam and disposed relative to said active medium so as to direct said beam into an end of said active medium, said active medium thereby being optically pumped so as to produce a coherent light output having an intensity,
    a second laser source emitting a beam of laser light and disposed relative to said active medium so as to direct additional laser light into a side of said active medium and thereby amplify the intensity of said coherent light output to effectively eliminate spiking and delays, and
    means for modulating at least one of said laser sources at a high frequency rate with well controlled high quality pulses, hereby providing modulation of said coherent light output.

11. The laser of claim 10 wherein said first laser source comprises at least one semiconductor laser and means for coupling a light output from said semiconductor laser into said end of said active medium.

12. The laser of claim 10 wherein said second laser source comprises at least one semiconductor laser, a light output from said laser being directed into said side of said active medium.

13. The laser of claim 12 wherein said light is focussed by one or more optical elements into said laser.

14. The laser of claim 10 wherein said first laser source comprises a continuous wave laser.

15. The laser of claim 10 wherein said means for modulating produces a modulated power output superimposed over a steady power output from at least one of said laser sources.

16. The laser of claim 10 wherein said second laser source comprises a pulsed laser.

17. A laser comprising,
    an active medium in a resonant optical cavity for producing a coherent light output having an intensity,
    at least one first semiconductor laser producing an output beam,
    means for coupling said output beam into an end of said active medium, said output beam pumping said active medium thereby causing a desired transverse cavity mode of said laser to resonate,
    at least one second semiconductor laser pumping a side of said active medium so as to amplify the intensity of side coherent light output of said active medium in said desired transverse cavity mode effectively eliminating spiking and delays, and means for modulating at least one of said first and second semiconductor lasers at a high frequency rate with well controlled high quality pulses, whereby said coherent light output of said active meduum has a modulated intensity.

18. The laser of claim 17 wherein said output beam of said first semiconductor laser pumps a volume of said active medium corresponding to a $TEM_{00}$ mode.

19. The laser of claim 17 wherein said first laser is a continuous wave laser.

20. The laser of claim 17 wherein said first laser is a pulsed laser, said first laser being on at least during time intervals when said second laser is on.

21. The laser of claim 17 wherein said second laser is a high repetition rate high peak power pulsed laser.

22. The laser of claim 17 wherein said first laser output beam pumps said active medium to pumping threshold of said desired transverse cavity mode.

23. The laser of claim 17 wherein said first laser output beam pumps said active medium so as to achieve lasing operation in said desired transverse cavity mode.

24. The laser of claim 17 wherein said first laser output beam pumps said active medium to above a pumping threshold of said desired transverse cavity mode.

25. The laser of claim 17 wherein said means for coupling includes one or more light refracting optical elements.

26. The laser of claim 17 wherein said means for coupling includes one or more light reflecting optical elements.

27. The laser of claim 17 wherein said means for coupling includes one or more light transmissive fibers.

28. The laser of claim 17 wherein said second laser produces a pulsed output beam.

29. The laser of claim 28 wherein said second laser has a peak power output which is substantially above a pumping threshold of said active medium.

30. The laser of claim 17 wherein said second laser is close coupled to said side of said active medium.

31. The laser of claim 17 wherein said second laser is fiber coupled to said side of said active medium.

32. The laser of claim 17 wherein said second laser is lens coupled to said side of said active medium.

33. The laser of claim 17 wherein said second laser is mirror coupled to said side of said active medium.

34. The laser of claim 17 wherein at least one of said semiconductor lasers has a modulated output beam, thereby providing a modulation of said coherent light output.

35. The laser of claim 34 wherein said first laser has an output beam characterizable as a modulated power output superimposed over a steady power output.

36. The laser of claim 34 wherein said second laser is characterized by a modulated pulsed output beam.

37. The laser of claim 17 wherein said active medium is composed of a solid state laser material.

38. The laser of claim 37 wherein said solid state laser material includes a crystalline host.

39. The laser of claim 37 wherein said solid state laser material includes a glass host.

40. A method for pumping a laser in a desired cavity mode comprising, directing laser light into an end of an active medium in a resonant optical cavity, said resonant optical cavity capable of supporting oscillation of at least one transverse cavity mode, said laser light optically pumping a volume portion of said active medium corresponding to a desired transverse cavity mode so as to produce a coherent light output having an intensity directing additional laser light into a side of said active medium, said additional laser light optically pumping said active medium so as to amplify the intensity of a coherent light output from said resonant optical cavity in said desired transverse cavity mode, wherein said additional laser light is pulsed, the pulsed light being characterized by a pulse length and a repetition rate, the method further comprising:

modulating said additional laser light at a high frequency rate with well controlled high quality pulses.

41. The method of claim 40 wherein directing laser light into an end of said active medium comprises coupling a laser output from one or more continuous wave semiconductor lasers into said end, said laser output having a power of at least near a pumping threshold of said active medium.

42. The method of claim 40 wherein directing additional laser light into a side of said active medium comprises coupling a laser output from one or more pulsed semiconductor lasers into said side, said laser output having a peak pulse power substantially above a pumping threshold of said active medium.

43. The method of claim 40 wherein said desired transverse cavity mode is a $TEM_{00}$ mode.

* * * * *